United States Patent
Nagashima (10) Patent No.: US 8,125,871 B2
(45) Date of Patent: Feb. 28, 2012

(54) RECORDING APPARATUS, RECORDING METHOD AND RECORDING PROGRAM

(75) Inventor: Hideki Nagashima, Tokyo (JP)

(73) Assignee: Sony Corporation (JP)

( * ) Notice: Subject to any disclaimer, the term of this patent is extended or adjusted under 35 U.S.C. 154(b) by 790 days.

(21) Appl. No.: 11/651,872

(22) Filed: Jan. 10, 2007

(65) Prior Publication Data

US 2007/0159943 A1   Jul. 12, 2007

(30) Foreign Application Priority Data

Jan. 12, 2006   (JP) ................................ P2006-005410

(51) Int. Cl.
  *G11B 21/08*   (2006.01)
  *G11B 3/70*   (2006.01)
(52) U.S. Cl. ...... 369/83; 369/275.3; 369/84; 369/47.12; 369/47.13; 369/53.24
(58) Field of Classification Search ................. 369/53.2, 369/53.21, 47.1, 59.1, 53.31, 275.3, 53.24, 369/59.25, 277, 278, 280, 83, 84, 47.12, 369/47.13; 711/112
See application file for complete search history.

(56) References Cited

U.S. PATENT DOCUMENTS

| 7,426,167 | B2* | 9/2008 | Watabe et al. | 369/59.25 |
| 7,430,157 | B2* | 9/2008 | Nishino et al. | 369/53.24 |
| 2006/0133241 | A1* | 6/2006 | Nakata | 369/47.5 |
| 2006/0171277 | A1* | 8/2006 | Usui et al. | 369/53.2 |
| 2006/0181981 | A1* | 8/2006 | Yamamoto et al. | 369/47.1 |
| 2007/0098950 | A1* | 5/2007 | Ando et al. | 428/64.4 |

FOREIGN PATENT DOCUMENTS

| JP | 2005-011473 A | 1/2005 |
| JP | 2005-018919 A | 1/2005 |

* cited by examiner

*Primary Examiner* — Wayne Young
*Assistant Examiner* — Dionne Pendleton
(74) *Attorney, Agent, or Firm* — Lerner, David, Littenberg, Krumholz & Mentlik, LLP (57) ABSTRACT

A recording apparatus that records data to an optical disc is disclosed. The recording apparatus includes a determination section that determines, when the optical disc is inserted, whether or not the recording condition information has been copied and recorded in the data recording area, a reading section that reads the recording condition information from the low recording-density area when the recording condition information has not been copied or recorded in the data recording area, and a recording section that copies and records the recording condition information read from the low recording-density area to a copy area in the data recording area while the optical disc is inserted.

6 Claims, 10 Drawing Sheets

FIG. 2

RECORDING PFI INFORMATION TO DISC COUNT ZONE

FIG. 8
CONFIGURATION OF ECC BLOCK

FIG. 9

RECORDING APPARATUS, RECORDING METHOD AND RECORDING PROGRAM

CROSS REFERENCES TO RELATED APPLICATIONS

The present invention contains subject matter related to Japanese Patent Application JP 2006-005410 filed in the Japanese Patent Office on Jan. 12, 2006, the entire contents of which being incorporated herein by reference.

BACKGROUND OF THE INVENTION

1. Field of the Invention

The present invention relates to a recording apparatus, a recording method and a recording program, which are suitably applied to, for example, a disc camcorder that uses a DVD+R (Digital Versatile Disc+Recordable) as a recording medium.

2. Description of the Related Art

Figure 6:
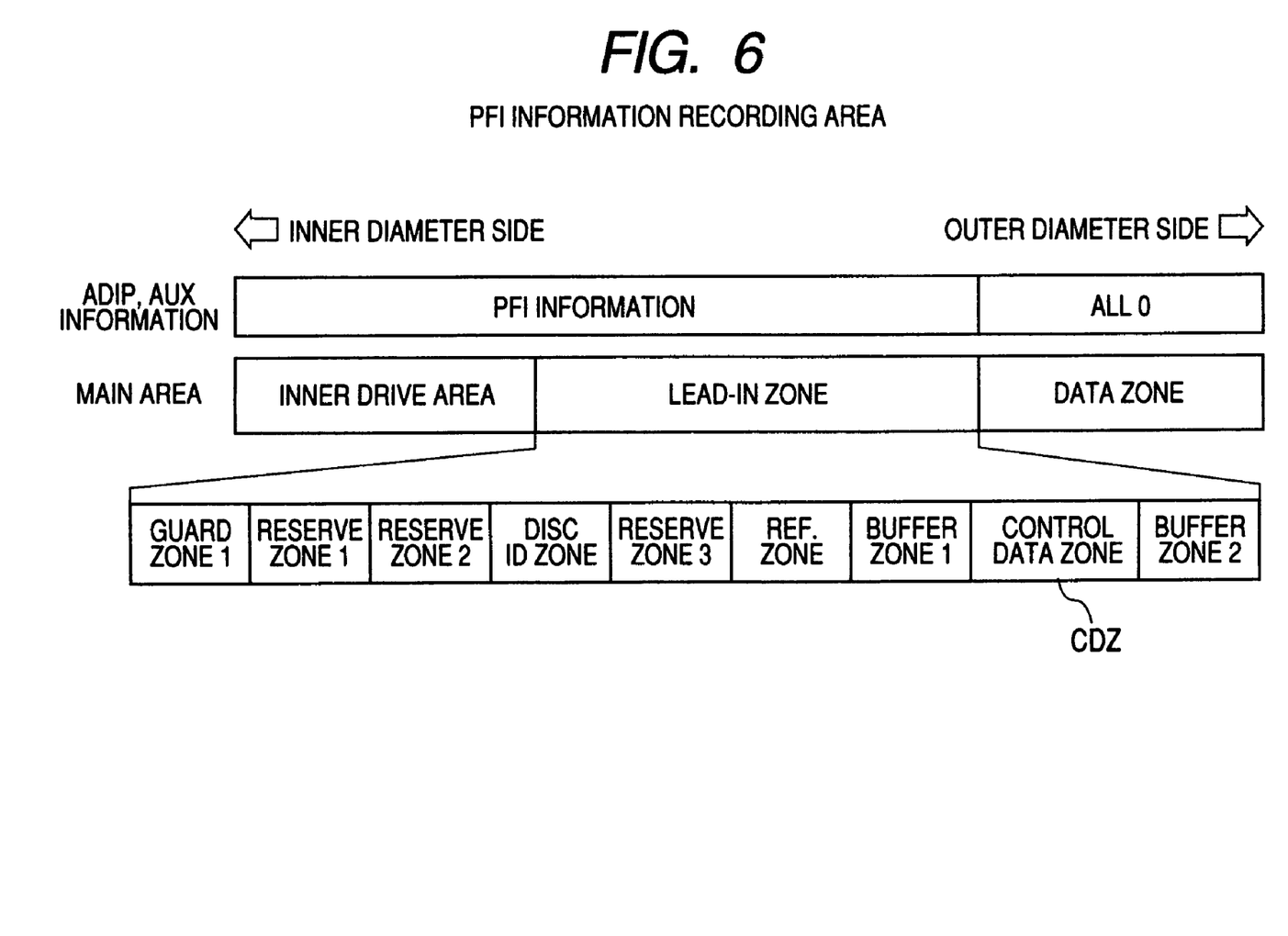
FIG. 6 is a schematic diagram showing the PFI information recording area.

In related art, a DVD+R used as a recording medium for a disc camcorder includes a main area formed of a data recording area as a recordable area having a predetermined recording density and an ADIP (Address In Pre-groove) formed of a data recording area having a recording density lower than that of the data recording area of the main area, as shown in FIG. 6.

The main area includes a data zone where imaging data and the like are recorded in the recording layer of the DVD+R, and the main area also includes, inside the data zone, an inner drive area, which is a disc management area, and a lead-in zone that is added to the start of a session.

The lead-in zone includes a disc ID (IDentification) zone and a control data zone CDZ, and the disc ID zone has disc ID information specific to the DVD+R pre-stored therein. On the other hand, the control data zone CDZ has PFI (Physical Format Information) information copied and recorded thereto in a finalizing process that allows reproducing the DVD+R on a typical DVD player or a DVD-ROM player. The PFI information is recording condition information pre-stored in the ADIP, such as the type and the recordable maximum address of the optical disc and information necessary in a recording process.

Figure 7A:
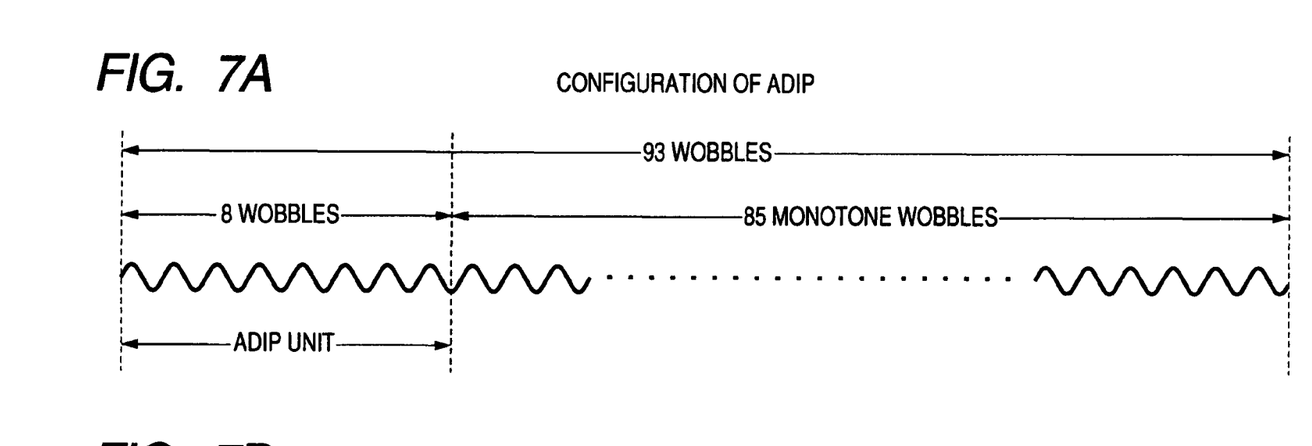
FIGS. 7A and 7B are schematic diagrams for explaining the configuration of the ADIP.

On the other hand, in the ADIP, AUX (AUXiliary) information including the PFI information is recorded in the form of a wobbling groove. As shown in FIG. 7A, one wobble corresponds to a 32-channel bit section, and 93 wobbles formed of 8 wobbles and 85 monotone wobbles form one unit. In practice, however, the section of the 85 monotone wobbles is a non-modulated 85-wave wobble section. Only the first 8 wobbles are phase-modulated to provide information as one ADIP unit.

Figure 7B:
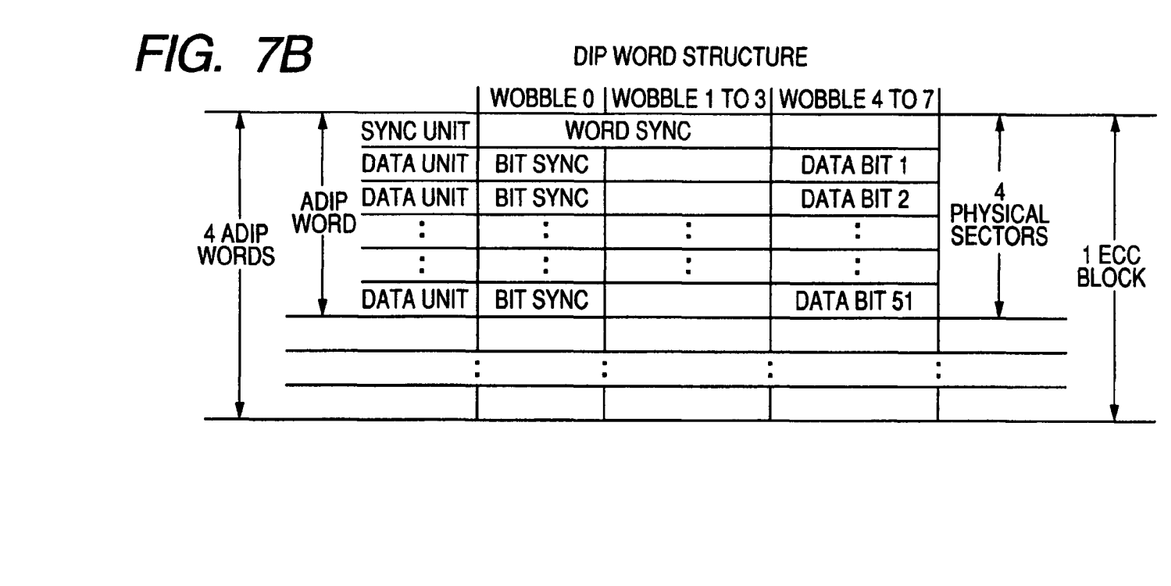

As shown in FIG. 7B, 52 ADIP units, each formed of 8 wobbles, form one ADIP word. "Wobble 0", "wobble 1 to 3" and "wobble 4 to 7" indicate each of the 8 wobbles as the ADIP unit. The first ADIP unit of an ADIP word is a sync unit, and "wobble 0" and "wobble 1 to 3" are phase-modulated wobbles as word sync.

Each of the second and the following ADIP units in the ADIP word is a data unit. "Wobble 0" represents a bit sync and each of "wobble 4 to 7" represents a data bit (that is, "1" or "0" as data). One ADIP word formed of 52 ADIP units corresponds to a 4-physical sector section. Four ADIP words form one ECC (Error Correction Code) block (hereinafter simply referred to as a block) as the ADIP.

Figure 8:
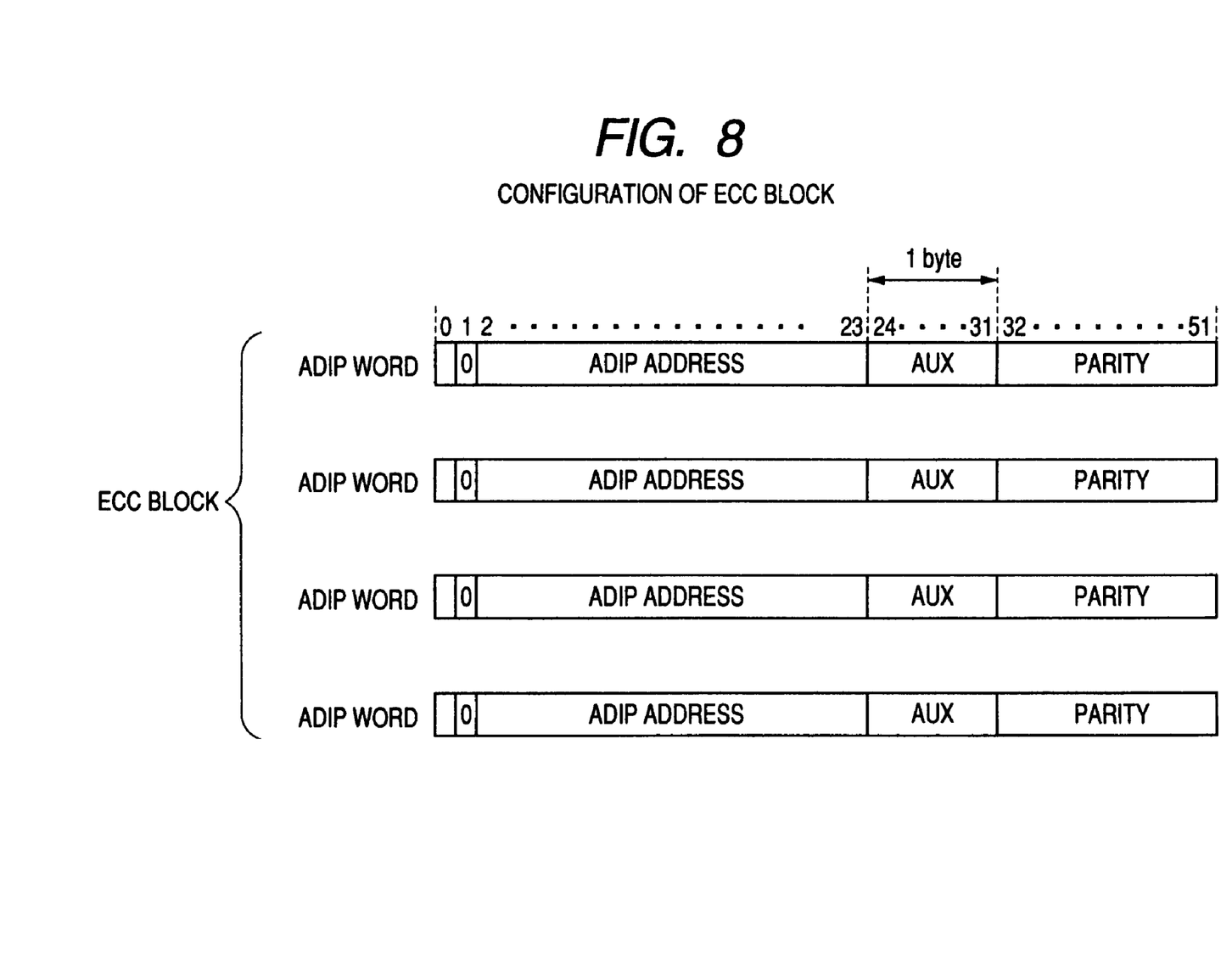
FIG. 8 is a schematic diagram showing the configuration of the ECC block.

As shown in FIG. 8, 51-bit data (data bits 1 to 51) except the word sync described above is acquired from one ADIP word. Data bits 2 to 23 are used to record an ADIP address. This ADIP address is recorded throughout the ADIP. Data bits 24 to 31 are AUX data and data bits 32 to 51 are ECC parity bits.

Therefore, the recording density of the ADIP is very low, and the PFI information is recorded as 1-byte AUX data per ADIP word (4 bytes of AUX data per block) on the inner diameter side of the DVD+R (that is, the portion corresponding to the inner drive area and the lead-in zone). The PFI information, which has 256 bytes of information, is recorded over 64 blocks.

On the other hand, the main area to which captured image data and other data are mainly recorded has a high recording density and can record the PFI information within one block.

Thus, a recording/reproducing apparatus, such as a disc camcorder, first performs a readout process on the high recording-density control data zone CDZ in a recording preparation process when an optical disc, such as a DVD+R, is inserted, and then reads the PFI information from the low recording-density ADIP only when the PFI information cannot be acquired from the control data zone CDZ (see JP-A-2005-18919, for example). The recording preparation process procedure RT1 of the related art will now be described with reference to the flowchart of FIG. 9.

Figure 9:
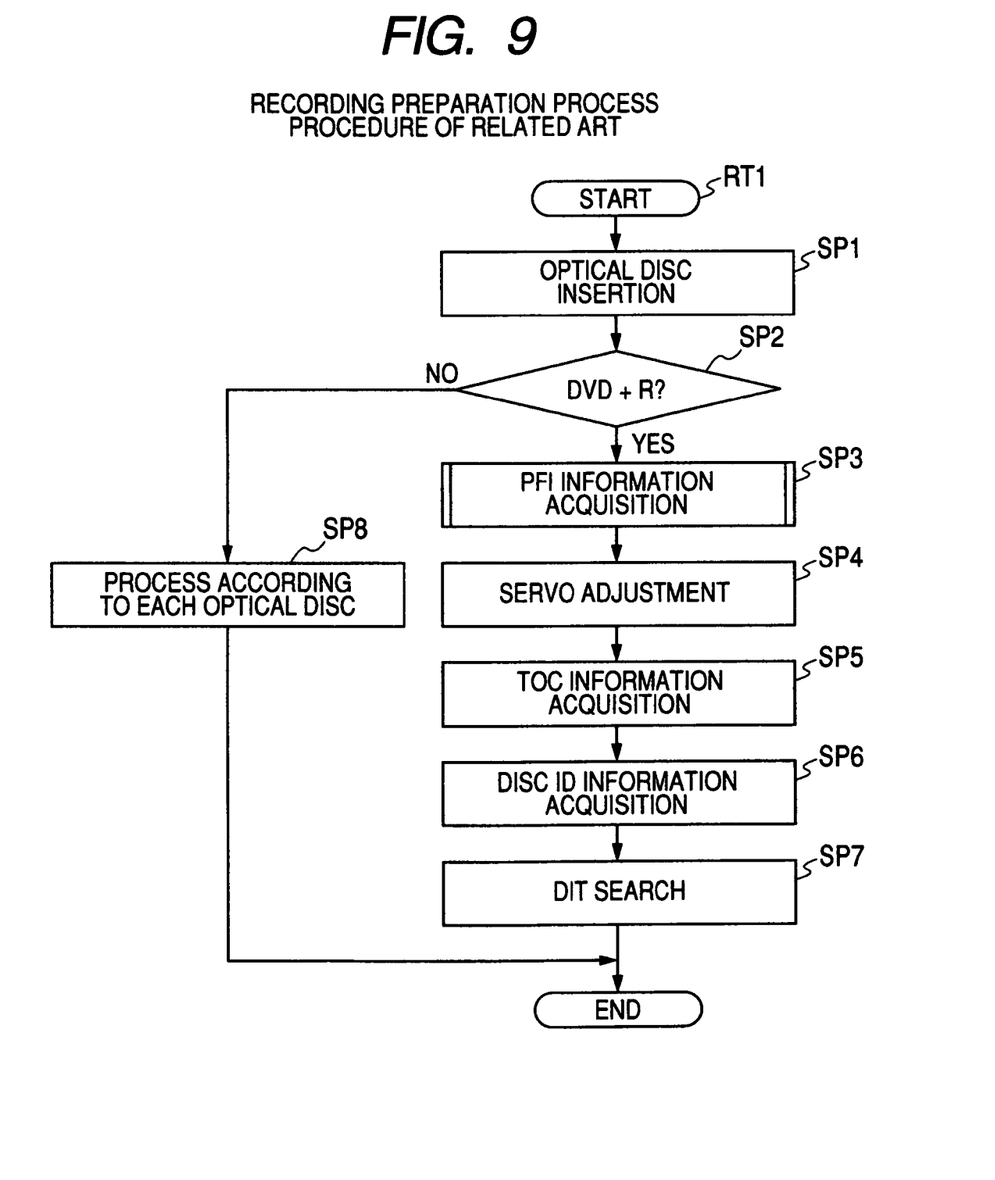
FIG. 9 is a flowchart for explaining the recording preparation process procedure of the related art.

When an optical disc is inserted at the step SP1, the disc camcorder determines the type of the optical disc at the next step SP2 and then performs the process corresponding to each type of optical disc. When the optical disc is a DVD+R, the disc camcorder proceeds to the next step SP3 and performs the readout process on the control data zone CDZ in the step SP11 in a subroutine SRT2 that represents a PFI information acquisition process of the related art shown in FIG. 10.

Figure 10:
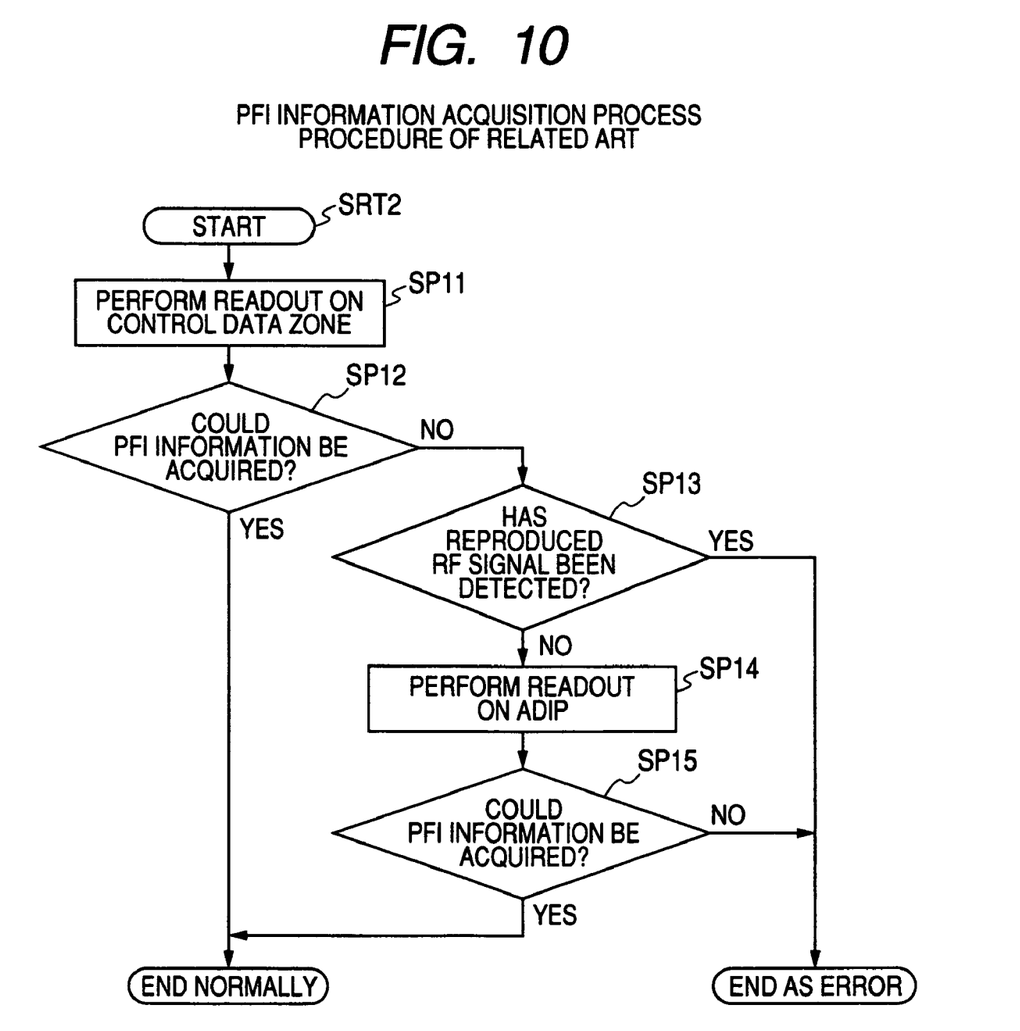
FIG. 10 is a flowchart for explaining the PFI information acquisition process procedure of the related art.

At the step SP12, when a reproduction process performed on the control data zone CDZ failed to acquire the PFI information in the form of a reproduced RF signal, the disc camcorder proceeds to the next step SP13, where the disc camcorder checks that the control data zone CDZ has no data recorded therein from the fact that the disc camcorder could detect no reproduced RF signal. Thereafter, the disc camcorder proceeds to the step SP14.

At the step SP14, the disc camcorder acquires the PFI information from the ADIP. When the disc camcorder checks that it could normally acquire the PFI information at the step SP15 or when the disc camcorder could acquire the PFI information at the step SP12, the disc camcorder proceeds to the step SP4 in the recording preparation process procedure RT1 of the related art (FIG. 9), where servo adjustment of an optical pickup is performed.

Then, at the steps SP5 and SP6, the disc camcorder acquires TOC (Table Of Contents) information indicative of the length and the start position of an imaged data file as well as the disc ID information. Then, at the step SP7, the disc camcorder searches a disc test zone DIT used as a trial write area for OPC (Optimum Power Control) and then terminates the process.

SUMMARY OF THE INVENTION

When an optical disc is inserted, the disc camcorder performs the recording preparation process described above and the disc camcorder cannot start recording imaging data to the optical disc until the recording preparation process has been completed. Therefore, there is a need for making the period of time for the recording preparation process as short as possible so as not to miss imaging opportunities.

However, when a DVD+R is inserted as an optical disc, the thus configured disc camcorder is designed to record the PFI information to the control data zone CDZ in a first session closing process. Therefore, whenever a DVD+R that has not undergone the first session closing process is inserted, the PFI information is acquired from the low recording-density ADIP. In this case, the disc camcorder performs the readout process over the 64 blocks in the ADIP to acquire the PFI information as described above, so that such a PFI information acquisition process takes a long period of time, and hence the period of time necessary for the recording preparation process becomes disadvantageously longer than when a DVD+R that has undergone the first session closing process is inserted.

In view of the above circumstances, it is desirable to provide a recording apparatus, a recording method and a recording program that reduces the period of time necessary for the recording preparation process even for an optical disc that has not undergone a predetermined closing process.

According to an embodiment of the invention, when an optical disc that includes a data recording area where data is recorded at a predetermined recording density and a low recording-density area that has a recording density lower than that of the data recording area is inserted, the low recording-density area having recording condition information pre-recorded therein and the recording condition information being copied and recorded to a predetermined write area predefined in the data recording area in a predetermined closing process, it is determined whether or not the recording condition information has been copied and recorded in the data recording area. When the recording condition information has not been copied or recorded in the data recording area, the recording condition information is read from the low recording-density area and the recording condition information read from the low recording-density area is copied and recorded to a copy area in the data recording area while the optical disc is inserted.

In this way, while the optical disc is inserted, the recording condition information can be reliably copied and recorded to the copy area in the data recording area. Therefore, when the optical disc is removed and inserted again, the recording condition information can be read from the copy area instead of the low recording-density area in the recording preparation process.

According to an embodiment of the invention, since the recording condition information can be reliably copied and recorded to the copy area in the data recording area while the optical disc is inserted, when the optical disc is removed and inserted again, the recording condition information can be read from the copy area instead of the low recording-density area in the recording preparation process. Therefore, there are provided a recording apparatus, a recording method and a recording program that reduce the period necessary for the recording preparation process even for an optical disc that has not undergone the predetermined closing process.

DESCRIPTION OF THE PREFERRED EMBODIMENTS

An embodiment of the invention will be described below in detail with reference to the drawings.

(1) Overall Configuration of the Disc Camcorder

Figure 1:
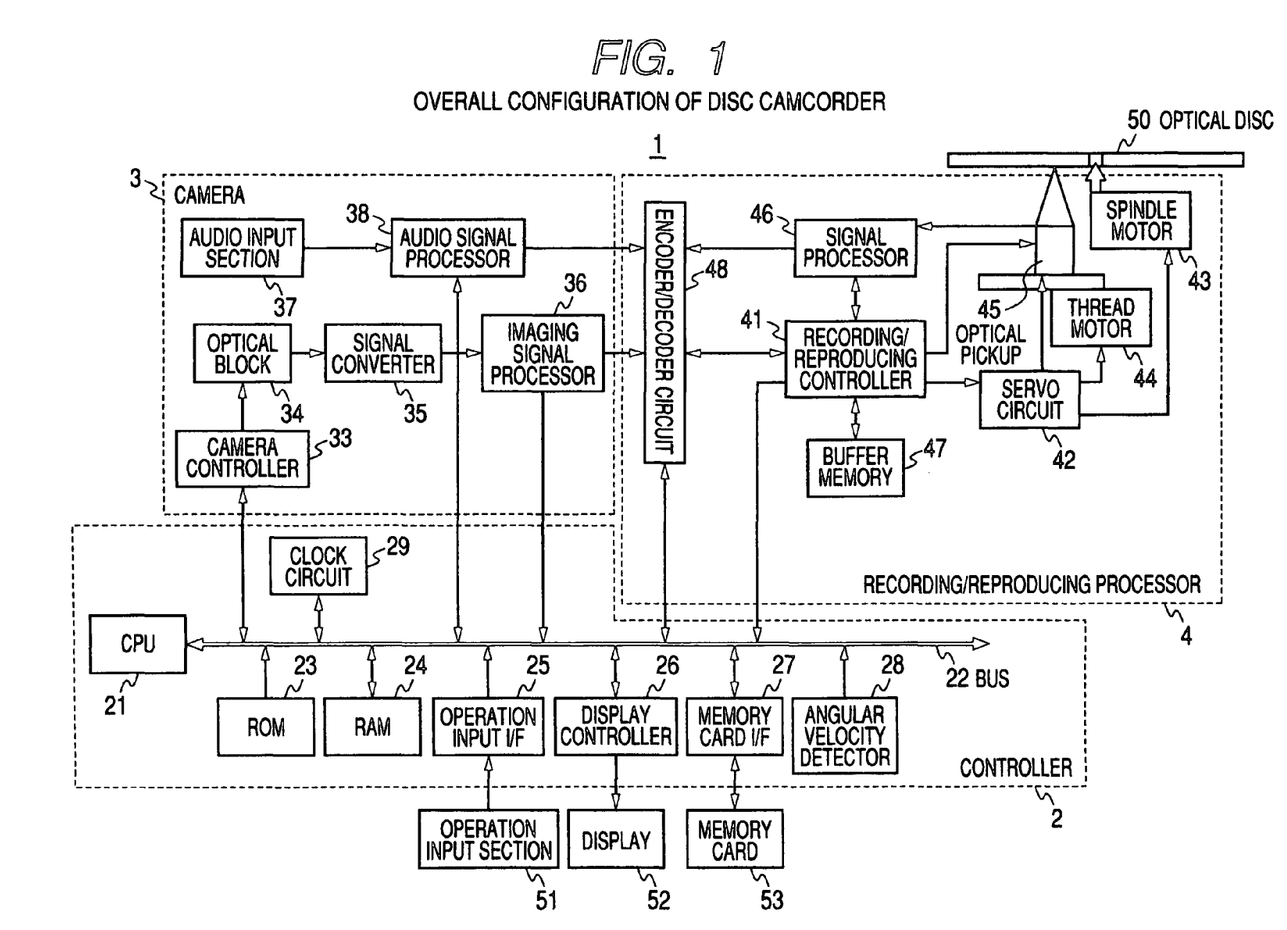
FIG. 1 is a schematic block diagram showing the overall configuration of the disc camcorder according to an embodiment of the invention.

In FIG. 1, reference numeral 1 generally shows the overall configuration of a disc camcorder and includes a controller 2, a camera 3 and a recording/reproducing processor 4. A CPU (Central Processing Unit) 21 in the controller 2 controls not only various portions in the controller 2 but also the camera 3 and the recording/reproducing processor 4 connected to the CPU 21 via a bus 22 so as to provide a centralized control of the entire disc camcorder 1. The CPU 21 also executes various processes and a recording preparation process at the time of optical disc insertion, which will be described later, based on various basic programs, a startup program and the like pre-stored in a ROM (Read Only Memory) 23 or a RAM (Random Access Memory) 24.

The controller 2 includes the ROM 23, the RAM 24, an operation input interface 25 connected to an operation input section 51 having various operation keys, a display controller 26 connected to a display 52 formed of an LCD (Liquid Crystal Display) or the like, a memory card interface 27, an angular velocity detector 28, which is a gyroscope, and a clock circuit 29, and each of the above components is connected to the CPU 21 via the bus 22.

The camera 3 includes a camera controller 33, an optical block 34 including a group of lenses for imaging a subject, a diaphragm adjustment mechanism, a focus adjustment mechanism, a zoom mechanism, a shutter mechanism, a flash mechanism and a hand-shake correction mechanism, a signal converter 35 formed of a CCD (Charge-coupled device) or the like, an imaging signal processor 36, an audio input section 37 and an audio signal processor 38.

The recording/reproducing processor 4 includes a recording/reproducing controller 41, a servo circuit 42, a spindle motor 43, a thread motor 44, an optical pickup 45, a signal processor 46, a buffer memory 47 and an encoder/decoder circuit 48.

When an optical disc 50 is inserted into a disc insert portion (not shown) of the disc camcorder 1 and an operation input signal indicative of, for example, imaging process start or reproducing process start, is supplied via the operation input interface 25 in response to user's operation of the operation input section 51, the CPU 21 generates a control signal according to the operation input signal and transmits it to the controller 2, the camera 3 and the recording/reproducing processor 4.

The camera controller 33 transmits a command signal according to the control signal supplied from the CPU 21 in the controller 2 to the optical block 34 so as to control the optical block 34 to capture imaging light.

The signal converter 35 converts the imaging light captured by the optical block 34 into an imaging signal and transmits it to the imaging signal processor 36. The imaging signal processor 36 provides gamma correction, AGC (Auto Gain Control) and analog-to-digital conversion on the supplied imaging signal to generate a captured image signal and transmits it to the CPU 21 and the encoder/decoder circuit 48 in the recording/reproducing processor 4.

At the same time, the audio input section 37 collects audio around the disc camcorder 1 and supplies it to the audio signal processor 38 as an audio signal. The audio signal processor 38 provides various types of correction, AGC and analog-to-digital conversion on the audio signal based on the control signal from the controller 2 to generate a digital audio signal and transmits it to the encoder/decoder circuit 48 in the recording/reproducing processor 4.

The recording/reproducing controller 41 in the recording/reproducing processor 4 transmits a command signal according to the control signal supplied from the CPU 21 in the controller 2 to various portions in the recording/reproducing processor 4 so as to control those portions to perform recording and reproducing processes.

When the captured image signal and the digital audio signal are supplied from the camera 3, the encoder/decoder circuit 48 encodes the captured image signal and the digital audio signal to generate an EFM+(Eight to Fourteen Modulation Plus) signal and transmits it to the recording/reproducing controller 41.

The recording/reproducing controller 41 temporarily stores the EFM+signal in the buffer memory 47 and controls the optical pickup 45 to perform the recording process on the optical disc 50.

That is, the recording/reproducing controller 41 rotates the spindle motor 43 via the servo circuit 42 to rotate the optical disc 50 placed on a rotary table (not shown). The optical pickup 45 emits laser light to a recording layer of the optical disc 50, photoelectrically converts the reflected laser light reflected from the recording layer of the optical disc 50 into a photoelectric signal according to the amount of the reflected light, and transmits it to the signal processor 46.

The signal processor 46 generates a tracking error signal and a focus error signal for controlling the optical pickup 45 according to the photoelectric signal supplied from the optical pickup 45 and transmits them to the recording/reproducing controller 41.

The recording/reproducing controller 41 controls the optical pickup 45 via the servo circuit 42, drives the thread motor 44 according to the tracking error signal, and moves the optical pickup 45 in the tracking direction. Furthermore, the recording/reproducing controller 41 drives an objective lens drive device of the optical pickup 45 in the tracking, focusing and tilting directions according to the tracking error signal and the focus error signal so as to move the objective lens to an optimum position.

In the reproducing process, the recording/reproducing controller 41 controls these portions in the recording/reproducing processor 4 as in the recording process.

In the reproducing process, the signal processor 46 generates a reproduced signal based on a photoelectric signal supplied from the optical pickup 45 and transmits it to the encoder/decoder circuit 48. The encoder/decoder circuit 48 decodes the reproduced signal into a reproduced image signal, which is image data, and transmits it to the CPU 21.

When the captured image signal or the reproduced image signal is supplied from the camera 3 or the recording/reproducing processor 4, the CPU 21 displays a captured image or a reproduced image based on the captured image signal or the reproduced image signal on the display 52 via the display controller 26.

The CPU 21 records imaging data supplied from the recording/reproducing processor 4 via the memory card interface 27 to a memory card 53, while reproducing imaging data recorded in the memory card 53 via the memory card interface 27 and supplying it to the recording/reproducing processor 4. The angular velocity detector 28 generates angular velocity information indicative of the angular velocity applied to the disc camcorder 1 from outside, and the clock circuit 29 generates time information indicative of year/month/day, hour/minute/second and the like.

(2) Recording Preparation Process at the Time of Optical Disc Insertion (2-1) Recognizing the Recorded Condition of an Optical Disc and Recording PFI Information A description will be made of a recording preparation process performed when an optical disc 50 is inserted into the insert portion of the disc camcorder 1.

When the optical disc 50 is inserted into the inert portion, the CPU 21 of the disc camcorder 1 performs a focus search in which the objective lens of the optical pickup 45 is moved in the focusing direction while the recording layer of the optical disc 50 is irradiated with the laser light. Using the resultant photoelectric signal according to the amount of the reflected laser light reflected from the optical disc 50, the CPU 21 detects the focus position of the objective lens with respect to the recording layer of the optical disc 50. Furthermore, based on this photoelectric signal, the CPU 21 determines the type of the optical disc and whether the optical disc is R or RW, and detects the presence/absence of the Wobble signal to determine + or −.

Since the formats of various types of optical discs 50, such as DVD+R (Digital Versatile Disc+Recordable) and DVD-R, are defined by respective standards so that the formats are different from each other, the CPU 21 performs a process according to the determined type of the optical disc 50.

For example, when the optical disc 50 is a DVD+R, the CPU 21 performs a readout process on the recording layer of the optical disc 50 to acquire the PFI (Physical Format Information) information, which is recording condition information described above with reference to FIG. 6, the TOC (Table Of Contents) information on a recorded imaging data file and the disc ID information specific to the optical disc so as to recognize the recorded condition of the optical disc 50.

That is, the CPU 21 controls the optical pickup 45 via the recording/reproducing controller 41 to move the objective lens of the optical pickup 45 to the focus position for the track in the recording layer of the optical disc 50 where various pieces of information are recorded, drives a laser diode to emit laser light, uses a photodiode to receive the reflected laser light reflected from the optical disc 50, uses the signal processor 46 to generate a reproduced RF signal from a photoelectric signal according to the amount of the reflected laser light, so as to read various pieces of information.

In this process, the CPU 21 can acquire the TOC information and the disc ID information by reading data corresponding to one or two ECC blocks (hereinafter simply referred to as a block) in a typical case, 16 blocks at the maximum, as well as the PFI information recorded in the control data zone CDZ by reading one-block data.

However, when the PFI information has not been recorded in the control data zone CDZ, the CPU 21 performs a readout process on the low recording-density ADIP to acquire the PFI information, as described above with reference to the DVD+R using FIG. 9. In this case, the CPU 21 has to read at least 64-block AUX data, so that the readout process takes a long period of time. Furthermore, the poor error correction ability of this data likely causes a readout error, resulting in another readout process. Such a readout error results in even longer period of time to acquire the PFI information.

When the optical disc 50 is a DVD+RW or a DVD-R/-RW, but when the PFI information has not been recorded in the control data zone CDZ or RMD (Recording Management Data) corresponding to the control data zone CDZ, the CPU 21 again acquires the PFI information from the ADIP or an LPP (Land Pre-Pit) corresponding to the ADIP, resulting in an longer PFI information acquisition time, as in the DVD+R.

However, according to the DVD+RW standard, in a formatting process performed before recording data, the PFI information acquired from the ADIP is copied and recorded to the control data zone CDZ. Therefore, while the CPU 21 reads the PFI information from the low recording-density ADIP when a virgin optical disc 50 that has not undergone the formatting process is inserted, the CPU 21 only needs to read the PFI information from the high recording-density control data zone CDZ when that optical disc 50 is inserted for the second time or later, because the PFI information has been recorded in the control data zone CDZ.

Similarly, according to the DVD-R/-RW standard, the PFI information is copied and recorded to the RMD when data is recorded, so that the CPU 21 only needs to read the PFI information from the high recording-density RMD when the optical disc 50 is inserted for the second time or later.

On the other hand, according to the definition of the DVD+R standard, a copy of the PFI information together with the last recorded address of the last recorded data are recorded to the control data zone CDZ in the first session closing process. This first session closing process is performed when the session is closed to allow reproduction on a typical DVD player so as to keep compatibility with playback-only DVD players. Therefore, it is not necessarily perform the closing process on an optical disc 50 even with imaging data recorded thereon. This first session closing process is performed, for example, in the finalizing process.

Therefore, if insertion and removal is performed on an optical disc 50 that has not undergone the first session closing process so that the PFI information has not been recorded in the control data zone CDZ, the CPU 21 has to acquire the PFI information from the ADIP whenever that optical disc 50 is inserted, so that the acquisition of the PFI information takes a longer period of time.

In the disc camcorder 1 according to an embodiment of the invention, when the optical disc 50 inserted into the insert portion is a virgin DVD+R that is inserted into the disc camcorder 1 for the first time, the disc camcorder 1 records the PFI information acquired from the ADIP to the disc management information area of the optical disc 50, so that the PFI information can be quickly acquired from the high recording-density disc management information area instead of the low recording-density ADIP when that optical disc 50 is inserted for the second time or later. A description will now be made of the process when a DVD+R is inserted as an optical disc 50.

Once the CPU 21 of the disc camcorder 1 determines that the optical disc 50 is a DVD+R, the CPU 21 first acquires the PFI information of the optical disc 50 in the process that will be described later and temporarily stores the PFI information in the RAM 24.

Upon the acquisition of the PFI information, the CPU 21 performs servo adjustment on the optical disc 50 based on the offset, gain and the like in the focusing, tracking and tilting directions with respect to the optical disc 50.

The CPU 21 performs a readout process on an inner drive area (FIG. 2), which is the management information area in the main area. This inner drive area includes, from the inner diameter side, an initial zone where no data is recorded, a disc test zone DIT used as a trial write area for OPC (Optimum Power Control), a disc count zone DIC that is an area for notifying usage of the disc test zone DIT, and a TOC zone where the TOC information is recorded.

Figure 2:
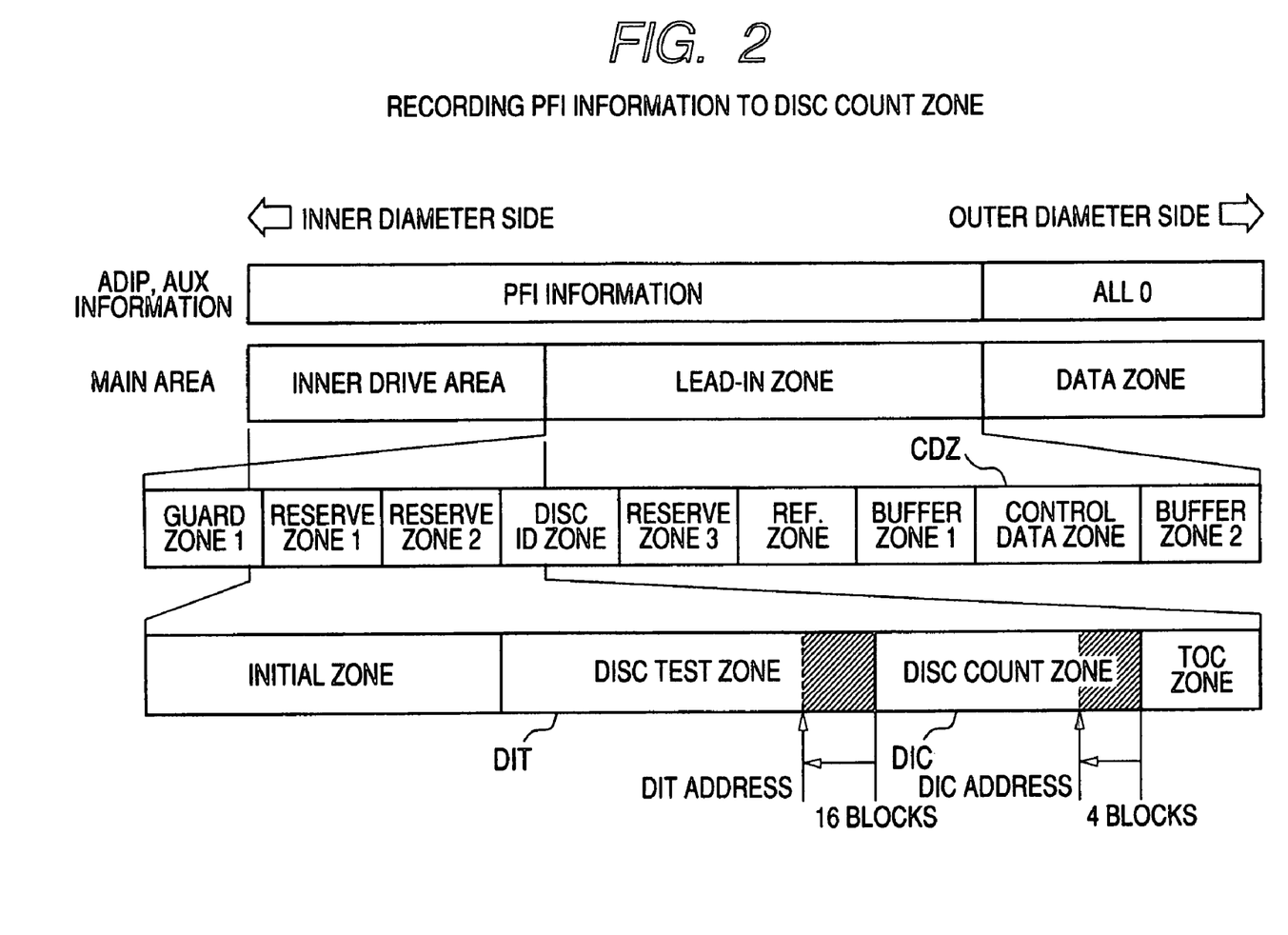
FIG. 2 is a schematic diagram for explaining the recording of the PFI information to the disc count zone.

The CPU 21 first reads the TOC information from the TOC zone and temporarily stores it in the RAM 24. At the same time, the CPU 21 acquires display information, such as the number of files stored on the optical disc 50, from the TOC information and displays such display information on the display 52. The CPU 21 also reads disc ID information from the disc ID zone in the lead-in zone and temporarily stores it in the RAM 24.

Then, the CPU 21 performs a readout process on the disc count zone DIC, acquires a DIC address indicative of the last used address of the disc count zone DIC, and determines whether or not data has been recorded in the disc test zone DIT. The disc count zone DIC is designed to notify the usage of trial write data that is actually written to the disc test zone DIT during the OPC process, and also designed to record whether or not the trial data has been recorded and the last recorded position used for the trial write. For example, when four-block trial write data is recorded in the disc test zone DIT, padding recording, which accordingly fills dummy data, records one block of such dummy data, which corresponds to one-fourth of the trial write data, to the disc count zone DIC.

When the CPU 21 checks the DIC address and determines that no data has been recorded in the disc test zone DIT, the CPU 21 reads the PFI information from the RAM 24, repeatedly records the PFI information over four blocks from the outer diameter side, which is the start of the disc count zone DIC, and increments the DIC address by four blocks.

The CPU 21 also performs padding recording over 16 blocks from the outer diameter side, which is the start of the disc test zone DIT, increments the last recorded position in the disc test zone DIT (an DIT address indicative of the last used address) by 16 blocks, and terminates the recording preparation process with the illumination position of the laser light from the optical pickup 45 held at the last recorded position in the disc test zone DIT indicated by the DIC address in preparation for the following OPC process.

In this way, even if the first session closing process has not been performed on the DVD+R, the CPU 21 can record the PFI information over the first 4 blocks in the disc count zone DIC where no limitation is placed on data to be recorded in the DVD+R standard, so as to record the PFI information in the main area of the optical disc 50 while complying with the DVD+R standard. Since the CPU 21 records the PFI information in the disc count zone DIC where data is recorded at a constant laser power instead of the disc test zone DIT where data is recorded at various laser power levels for OPC, the PFI information can be reliably read out without creating a problematic situation in which an address used in the seek operation cannot be read out from the recorded data in the PFI information readout process.

On the other hand, when the disc count zone DIC has data recorded therein and has been already used, the CPU 21 terminates the recording preparation process with the illumination position of the laser light from the optical pickup 45 held as it is in the disc test zone DIT.

In this way, for a virgin optical disc 50 in which no data has recorded in disc count zone DIC, the disc camcorder 1 records a copy of the PFI information read out from the low recording-density ADIP to the disc count zone DIC, so that the PFI information can be reliably copied and recorded in the main area of the optical disc 50.

(2-2) Acquiring PFI Information

A description will be made of acquisition of the PFI information that is first performed when the disc camcorder 1 determines that the optical disc 50 inserted into the insert portion is a DVD+R in the recording preparation process at the time of optical disc insertion.

As shown in FIG. 2, the CPU 21 of the disc camcorder 1 first performs the readout process of the PFI information on the control data zone CDZ in the lead-in zone in the high recording-density main area. As described above, in the optical disc 50, when the first session closing process has been performed, the PFI information has been recorded in the control data zone CDZ, while when the first session closing process has not been performed, no data has been recorded in the control data zone CDZ.

When the inserted optical disc 50 has undergone the first session closing process, the CPU 21 acquires the PFI information from the control data zone CDZ, temporarily stores the PFI information in the RAM 24 and then completes the acquisition of the PFI information.

On one hand, when the CPU 21 could not acquire the PFI information from the control data zone CDZ, the CPU 21 determines whether or not the CPU 21 could detect a reproduced RF signal from the control data zone CDZ. When the reproduced RF signal was detected but the PFI information could not be detected for some reason, the CPU 21 terminates the process as an error.

On the other hand, when the CPU 21 could not acquire the PFI information or a reproduced RF signal from the control data zone CDZ, the CPU 21 recognizes that no data has been recorded in the control data zone CDZ and performs a readout process on the outer diameter-side start portion of the disc count zone DIC.

As described above, in an optical disc 50 that has been inserted into the disc camcorder 1 at least once, the PFI information has been copied and recorded in the high recording-density disc count zone DIC in the recording preparation process at the time of optical disc insertion. On the other hand, in a virgin optical disc 50 that has not been inserted into a disc camcorder, the PFI information has not been copied or recorded in the disc count zone DIC, but only has been recorded in the low recording-density ADIP.

When the inserted optical disc 50 has the PFI information copied and recorded in the disc count zone DIC, the CPU 21 acquires the PFI information from the disc count zone DIC, temporarily stores the PFI information in the RAM 24 and then completes the acquisition of the PFI information.

On the other hand, when the PFI information has not been copied or recorded in the disc count zone DIC, the CPU 21 performs the readout process on the low recording-density ADIP.

In this case, when the CPU 21 could acquire the PFI information from the ADIP, the CPU 21 temporarily stores the PFI information in the RAM 24 and then completes the acquisition of the PFI information. On the other hand, when the CPU 21 could not acquire the PFI information from the ADIP due to a reproducing error or the like, the CPU 21 terminates the process as an error.

Upon the completion of PFI information acquisition from any of the control data zone CDZ, the disc count zone DIC or the ADIP, the CPU 21 performs servo adjustment as the next process and continues the recording preparation process at the time of optical disc insertion.

In this way, when the CPU 21 could not acquire the PFI information from the control data zone CDZ, the CPU 21 performs the readout process on the high recording-density disc count zone DIC before performing the readout process on the low recording-density ADIP, so that the PFI information can be acquired from the high recording-density disc count zone DIC instead of the low recording-density ADIP except for a virgin optical disc 50 that is inserted into the disc camcorder 1 for the first time, thereby reducing the PFI information acquisition time.

Figure 4:
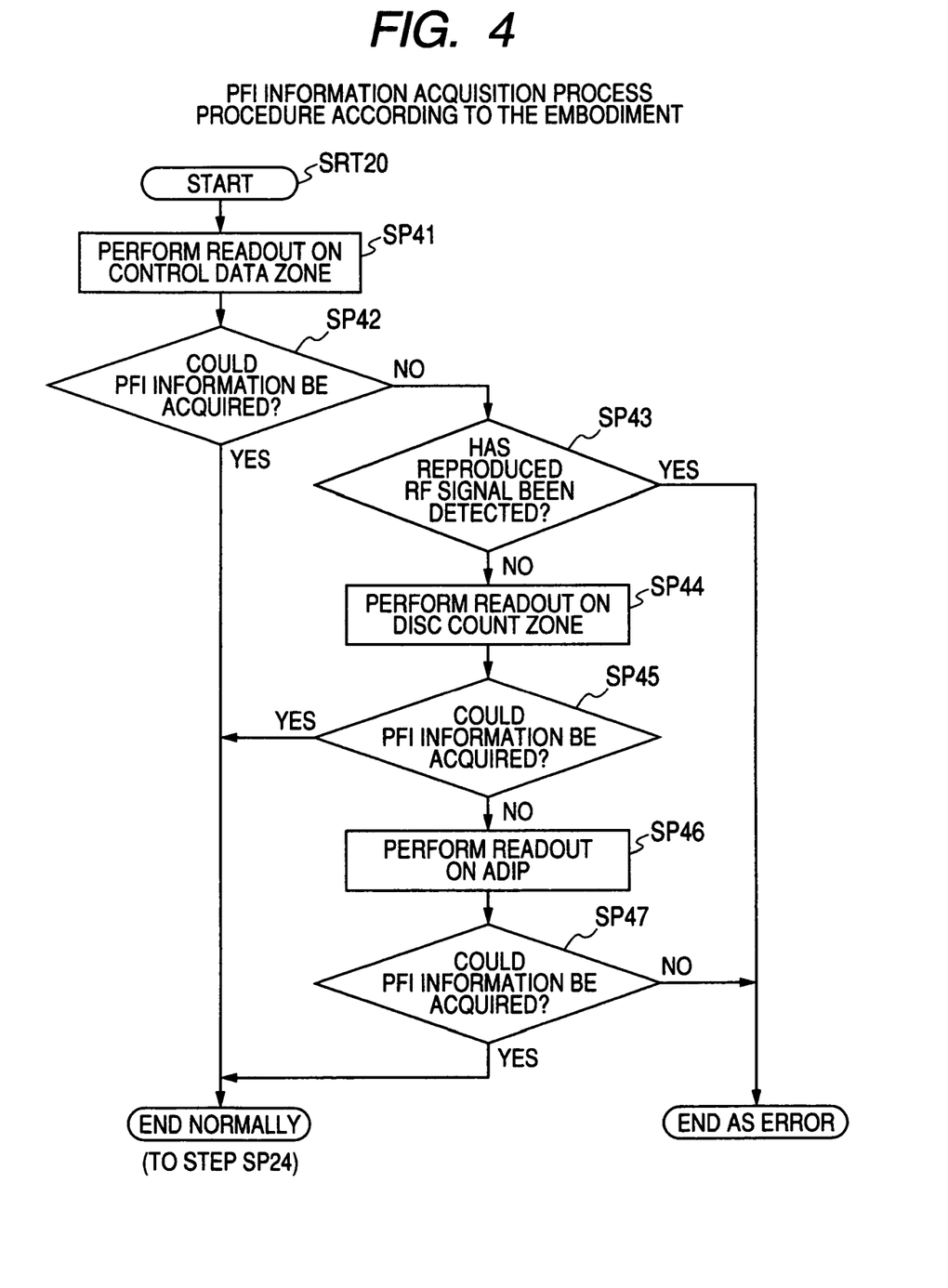
FIG. 4 is a flowchart for explaining the PFI information acquisition process procedure according to the embodiment.
Figure 5:
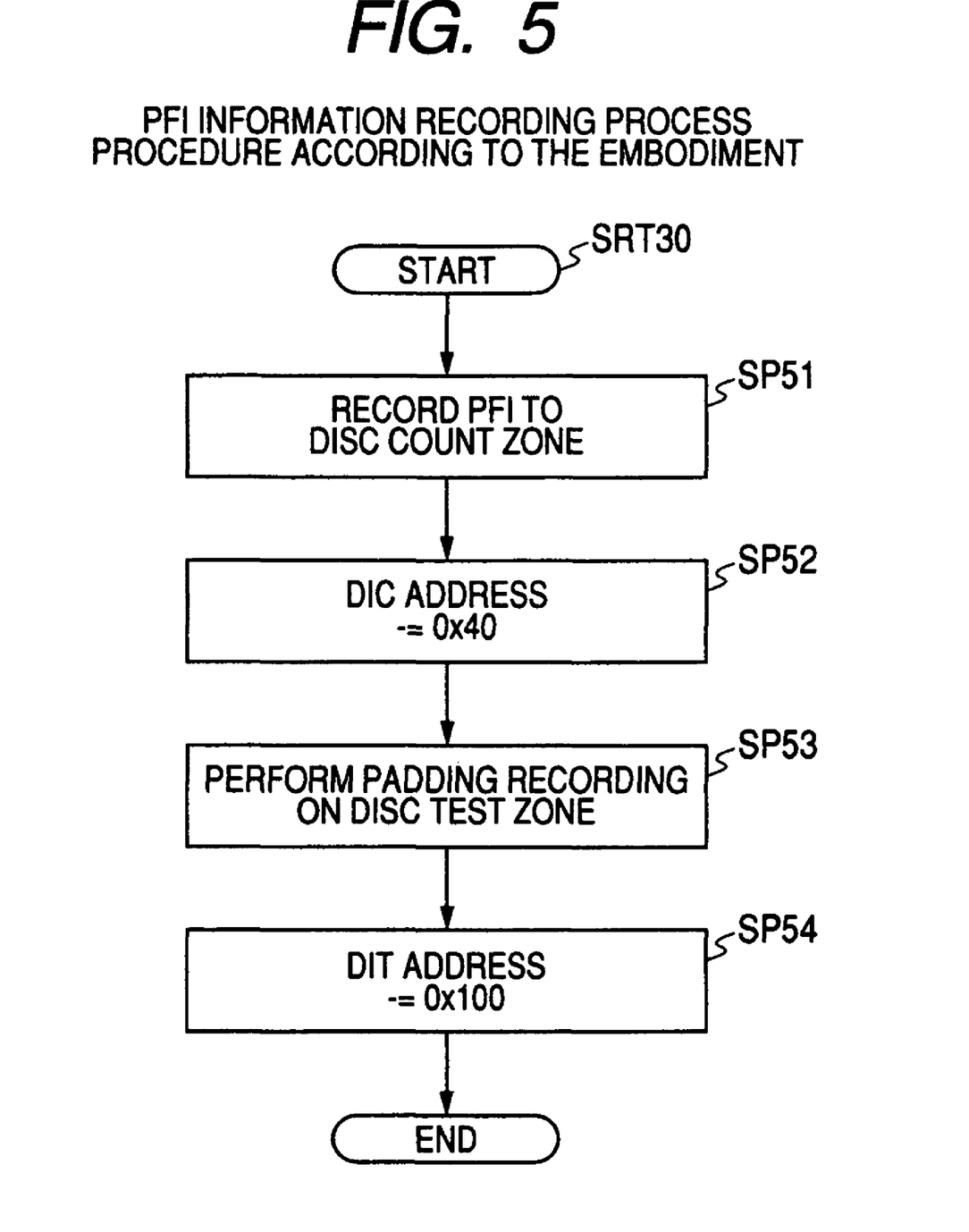
FIG. 5 is a flowchart for explaining the PFI information recording process procedure according to the embodiment.

(3) Procedure of the Recording Preparation Process at the Time of Optical Disc Insertion Next, a description will be made of the recording preparation process procedure RT10 at the time of optical disc insertion shown in FIG. 3 performed according to the startup program, a subroutine SRT20 showing the PFI information acquisition process procedure and a subroutine SRT30 showing the PFI information recording process procedure with reference to the flowcharts shown in FIGS. 3 to 5.

When the recording preparation process procedure RT10 at the time of optical disc insertion is initiated, the CPU 21 of the disc camcorder 1 waits for the insertion of the optical disc 50 into the insert portion at the step SP21, and proceeds to the step SP22 after the optical disc 50 was inserted.

The CPU 21 checks the type of the optical disc 50 and determines whether or not the optical disc 50 is a DVD+R. When the result is NO, the CPU 21 proceeds to the step SP30 to perform a process according to the type of the optical disc 50 in order to recognize the recorded condition of the optical disc 50. Then, the CPU 21 proceeds to the step SP31 and terminates the process.

On the other hand, when the result is YES at the step SP22, the CPU 21 continues the recording preparation process procedure RT10 at the time of optical disc insertion as the process according to the format of the optical disc 50, that is, the CPU 21 proceeds to the next step SP23 and acquires the PFI information from the optical disc 50.

That is, at the step SP23, the CPU 21 proceeds to the step SP41 of the subroutine SRT20 (FIG. 4), performs the readout process on the control data zone CDZ in the high recording-density lead-in zone (FIG. 2) and then proceeds to the next step SP42.

At the step SP42, the CPU 21 determines whether or not the PFI information could be acquired from the control data zone CDZ. When the result is YES, which means that the acquisition of the PFI information has been completed, the CPU 21 normally terminates the subroutine SRT20 and proceeds to the step SP24 of the recording preparation process procedure RT10 at the time of optical disc insertion (FIG. 3).

On the other hand, when the result is NO at the step SP42, the CPU 21 proceeds to the next step SP43 and determines whether or not the CPU 21 could detect a reproduced RF signal when the readout process was performed on the control data zone CDZ.

When the result is YES, which means that the CPU 21 could not read the PFI information recorded in the control data zone CDZ, the CPU 21 aborts the PFI information acquisition and terminates the process as an error.

On the other hand, when the result is NO at the step SP43, which means that the control data zone CDZ has no data recorded therein and the PFI information needs to be acquired from other areas, the CPU 21 proceeds to the next step SP44.

At the step SP44, the CPU 21 performs the readout process on the first 4 blocks in the disc count zone DIC (FIG. 2) in the inner drive area, which is a high recording density area and has high recorded data correction ability, and then proceeds to the next step SP45.

At the step SP45, the CPU 21 determines whether or not the PFI information could be acquired from the disc count zone DIC. When the result is YES, which means that the acquisition of the PFI information has been completed, the CPU 21 normally terminates the subroutine SRT20 and proceeds to the step SP24 of the recording preparation procedure process RT10 at the time of optical disc insertion (FIG. 3).

On the other hand, when the result is NO at the step SP45, the CPU 21 proceeds to the next step SP46, performs the readout process on the ADIP (FIG. 2), which is a low recording-density area, and then proceeds to the next step SP47.

At the step SP47, the CPU 21 determines whether or not the PFI information could be acquired from the ADIP.

When the result is NO, which means that the PFI information could not be acquired even though all possible areas where the PFI information might have been recorded underwent the readout processes, the CPU 21 aborts the PFI information acquisition and terminates the process as an error.

Figure 3:
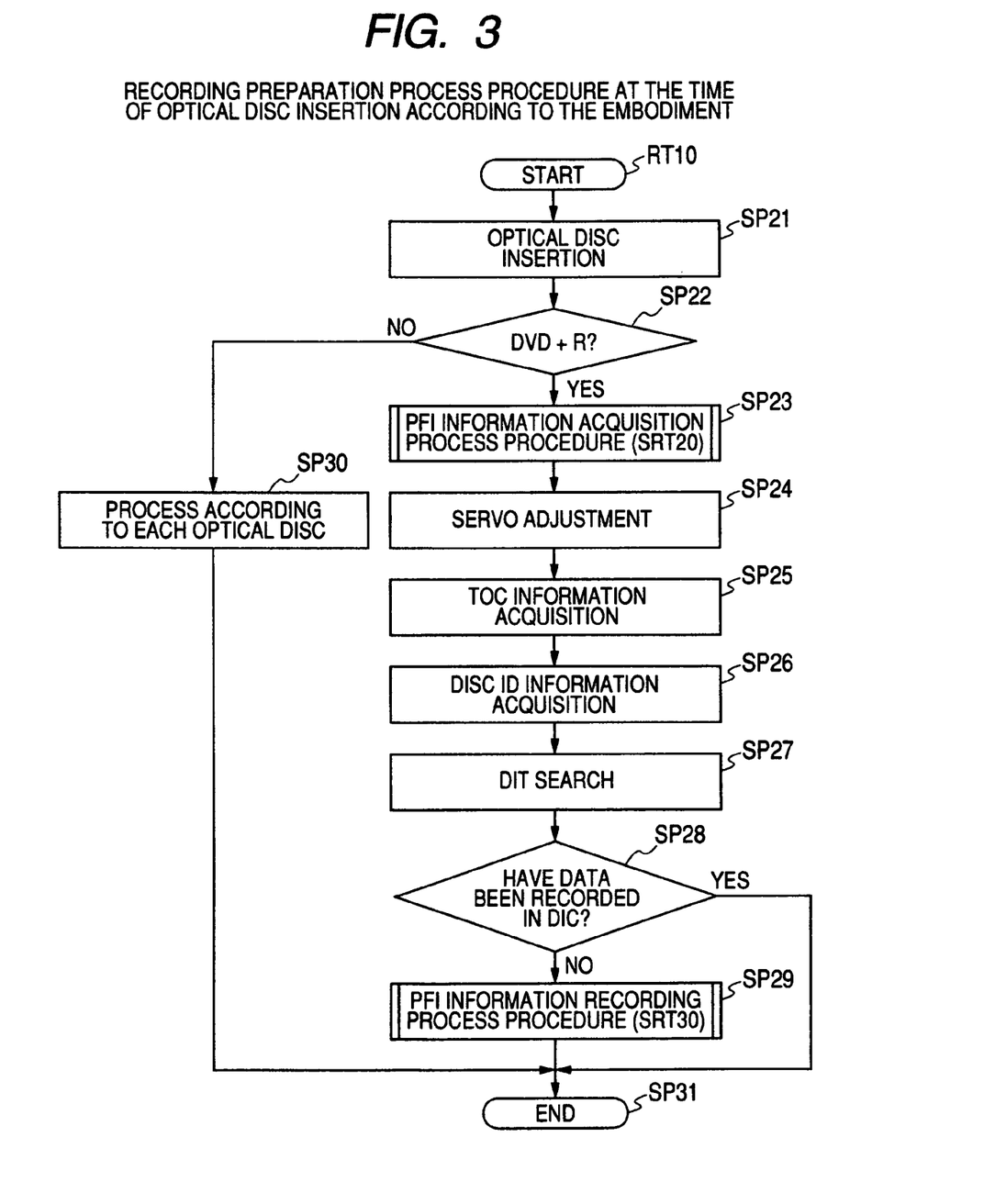
FIG. 3 is a flowchart for explaining the recording preparation process procedure at the time of optical disc insertion according to the embodiment.

On the other hand, when the result is YES at the step SP47, which means that the acquisition of the PFI information has been completed, the CPU 21 normally terminates the subroutine SRT20 and proceeds to the step SP24 of the recording preparation process procedure RT10 at the time of optical disc insertion (FIG. 3).

The CPU 21 performs the servo adjustment at the step SP24, acquires the TOC information indicative of information on imaging data files from the TOC zone in the inner drive area (FIG. 2) at the next step SP25, acquires the disc ID information specific to the optical disc 50 from the disc ID zone in the lead-in zone at the next step SP26, and then proceeds to the next step SP27.

At the step SP27, the CPU 21 searches the disc count zone DIC, reads the DIC address indicative of the DIT address of the disc test zone DIT from the lead-in zone, and then proceeds to the next step SP28.

At the step SP28, the CPU 21 determines whether or not data has been recorded in the first 4 blocks in the disc count zone DIC. When the result is YES, which means that the PFI information has been recorded in the disc count zone DIC, the CPU 21 proceeds to the next step SP31 and terminates the process.

On the other hand, when the result is NO at the step SP28, which means that the optical disc 50 is a virgin disc and the PFI information has not been recorded in the disc count zone DIC, the CPU 21 proceeds to the next step SP29 and records the PFI information to the disc count zone DIC.

That is, at the step SP29, the CPU 21 proceeds to the step SP51 of the subroutine SRT30 (FIG. 5), repeatedly records the PFI information over the first 4 blocks in the disc count zone DIC, checks that the DIC address advances by 4 blocks (DIC Address-=0*40) at the next step SP52, and then proceeds to the next step SP53.

At the step SP53, the CPU 21 performs the padding recording of dummy data over the first 16 blocks in the disc test zone DIT, checks that the DIT address advances by 16 blocks (DIT Address-=0*100) at the next step SP54, proceeds to the step SP31 of the recording preparation process procedure RT10 at the time of optical disc insertion (FIG. 3), and then terminates the process.

(4) Operations and Advantages

In the above configuration, when a DVD+R in which the PFI information, which is the recording condition information, is recorded in the ADIP, which is an area having a recording density lower than that of the main area that is the data recording area, and the PFI information will not be recorded to the control data zone CDZ, which is the write area, until the first session closing process, which is a predetermined closing process, is performed is inserted as an optical disc 50, the CPU 21 of the disc camcorder 1 determines whether or not data has been recorded in the disc count zone DIC, which is the copy area, to determine whether or not the PFI information has been copied and recorded in the high recording-density main area of the optical disc 50. When the CPU 21 determines that the PFI information has not been copied or recorded in the main area from the fact that no data has been recorded in the disc count zone DIC, the CPU 21 reads the PFI information from the ADIP and copies and records the PFI information to the disc count zone DIC.

In this way, during the period from the insertion of the optical disc 50 to the removal thereof, the CPU 21 can reliably achieve the situation where the PFI information has been copied and recorded in the disc count zone DIC. When the optical disc 50 is removed and inserted again, the CPU 21 can read the PFI information from the disc count zone DIC, so that the recording preparation process will be quickly completed and the optical disc 50 becomes recordable (ready for starting an imaging operation). Therefore, the period from the time when the user inserts the optical disc 50 into the disc camcorder 1 to the time when the user starts an imaging operation can be reduced, so that imaging data can be recorded without missing imaging opportunities.

Furthermore, since the CPU 21 copies and records the PFI information to the disc count zone DIC, which is the existing management information area, the data zone in the main area where imaging data is recorded is not used, preventing the decrease in recording capacity of the entire data zone. Since the disc count zone DIC has enough recording capacity, 4 blocks used to record the PFI information will not cause any problems, such as lack of data capacity for the OPC process.

In the recording preparation process at the time of optical disc insertion, which is performed before imaging data is recorded to the optical disc 50, the CPU 21 first performs the readout process on the 1 block in the control data zone CDZ, performs the readout process on the 4 blocks in the disc count zone DIC only when the CPU 21 could not acquire the PFI information from the control data zone CDZ because no data has been recorded therein, and performs the readout process on the 64 blocks in the ADIP only when the CPU 21 could not acquire the PFI information from the disc count zone DIC because no data has been recorded therein, so as to acquire the PFI information from the optical disc 50. In this way, when the CPU 21 could not read the PFI information from the control data zone CDZ or the disc count zone DIC, the CPU 21 reads the PFI information from the ADIP.

Thus, in the PFI information acquisition process, the CPU 21 sequentially performs the readout processes on the above areas in ascending order of the number of recording blocks and hence the readout time, acquires the PFI information and proceeds to the next process, so that the period of time for the PFI information acquisition process, and hence the period of time for the recording preparation process at the time of optical disc insertion can be minimized.

According to the above configuration, when a DVD+R in which the PFI information is recorded in the ADIP, which is an area having a recording density lower than that of the main area, and the PFI information will not be copied or recorded to the main area until the first session closing process is performed is inserted as an optical disc 50, the disc camcorder 1 according to an embodiment of the invention determines whether or not data has been recorded in the disc count zone DIC, reads the PFI information from the ADIP when no data has been recorded in the disc count zone DIC and copies and records the PFI information to the disc count zone DIC, so that the disc camcorder 1 can reliably achieve the situation where the PFI information has been copied and recorded in the disc count zone DIC of the optical disc 50. Therefore, when the optical disc 50 is removed and inserted again, the disc camcorder 1 can read the PFI information from the high recording-density disc count zone DIC instead of the low recording-density ADIP, so that the period of time for the recording preparation process can be reduced even when the optical disc 50 has not undergone the first session closing process.

(5) Other Embodiments

In the above embodiment, although the description has been made of the case where the PFI information is repeatedly recorded over the 4 blocks in the disc count zone DIC, the invention is not limited thereto. No limitation is placed on the amount of PFI information data to be recorded, and the PFI information may be repeatedly recorded a predetermined times instead of defining the amount of data to be recorded.

In the above embodiment, although the description has been made of the case where the PFI information is recorded over the 4 blocks in the disc count zone DIC and the padding recording of dummy data is performed over the corresponding 16 blocks in the corresponding disc test zone DIT, the invention is not limited thereto. The padding recording of the dummy data may not necessarily be performed on the disc test zone DIT.

In the above embodiment, although the description has been made of the case where the PFI information is recorded before the OPC process, the invention is not limited thereto. The PFI information may be recorded after the OPC process. In this case, for example, the disc camcorder 1 first acquires the DIT address, performs the OPC process on the 17th block and the following blocks in the disc test zone DIT, and controls the optical pickup 45 under an optimized recording condition to record the PFI information.

In this way, the disc camcorder 1 can record the PFI information under the recording condition optimized by the OPC process, so that the PFI information can be recorded at an even higher accuracy.

In the above embodiment, although the description has been made of the case where the PFI information is recorded in the disc count zone DIC in the recording preparation process at the time of optical disc insertion, the invention is not limited thereto. The PFI information may be recorded at any timing during the period from the insertion of the optical disc 50 to the removal thereof, for example, when the user gives an instruction to remove the optical disc 50.

In the above embodiment, although the description has been made of the case where the PFI information is recorded in the disc count zone DIC, the invention is not limited thereto. The PFI information may be recorded in any area in the main area where the standard does not define the contents of data to be recorded. For example, the PFI information may be recorded in an administration zone or the disc test zone DIT.

In the above embodiment, although the description has been made of the case where the PFI information is recorded to the outer diameter-side start portion of the disc count zone DIC, the invention is not limited thereto. The recording of the PFI information may be initiated at any position.

In this case, for example, the PFI information may be recorded at a predetermined recording position that is in the disc count zone DIC and used less frequently in the OPC process. In this way, when a non-virgin optical disc 50 having data recorded in part of the disc count zone DIC is inserted into a recording apparatus of related art to which the invention has not been applied and it is determined that no data has been recorded at the predetermined recording position, the PFI information can be recorded to that recording position.

In the above embodiment, although the description has been made of the case where a DVD+R is used as the optical disc 50, the invention is not limited thereto. No limitation is placed on the type of the optical disc 50 and an advantage similar to that obtained in the above embodiment is provided even when any optical disc is used, as long as the optical disc is configured such that physical information on the optical disc is pre-stored in the low recording-density ADIP or LPP and when the optical disc is removed, the physical information on the optical disc is not copied or recorded.

In the above embodiment, although the description has been made of the case where the disc camcorder 1 uses an optical disc 50 having one recording layer to process one piece of PFI information, the invention is not limited thereto. When an optical disc having two recording layers is inserted, two pieces of PFI information recorded in the first and second recording layers are both recorded in one disc count zone DIC. Since the amount of PFI information data in this case, even when two pieces of PFI information are added, is within the capacity of one block, the two pieces of PFI information can be recorded in the same 4-block area as in the present embodiment without any problem. In this process, the two pieces of PFI information may be simply recorded in a sequential manner, and when the two pieces of PFI information are read out, it is determined which PFI information corresponds to the first or second layer based on the contents of the data. Alternatively, identification information may be separately added to each of the two pieces of PFI information such that the two pieces of PFI information are identified.

In the above embodiment, although the description has been made of the case where the disc camcorder 1 performs the readout processes in the order of the control data zone CDZ, the disc count zone DIC and the ADIP, the invention is not limited thereto. The readout processes may be performed in the order of the disc count zone DIC, the control data zone CDZ and the ADIP.

For the disc camcorder 1 primarily used for reproducing, an optical disc 50 that has undergone the first session closing process is likely to be inserted, while for the disc camcorder 1 primarily used for recording, an optical disc 50 that has not undergone the first session closing process is likely to be inserted. Therefore, the order of the readout processes is appropriately changed according to an optical disc 50 that is expected to be inserted such that for the disc camcorder 1 primarily used for reproducing, the readout process is first performed on the control data zone CDZ, while for the disc camcorder 1 primarily used for recording, the readout process is first performed on the disc count zone DIC, allowing an even shorter period of time to complete the PFI information acquisition.

In the above embodiment, although the description has been made of the case where the disc camcorder 1 having imaging, recording and reproducing capabilities performs the recording preparation process at the time of optical disc insertion, the invention is not limited thereto. Even when a computer having a capability of recording data to an optical disc, a recording apparatus only having a recording capability, or a recording/reproducing apparatus only having recording and reproducing capabilities performs the recording preparation process at the time of optical disc insertion, an advantage similar to the above embodiment can be obtained.

In the above embodiment, although the description has been made of the case where the disc camcorder 1, which is the recording apparatus according to an embodiment of the invention, includes the CPU 21, which is a determination section, and the optical pickup 45, which is a reading and recording section, the invention is not limited thereto. The recording apparatus may include a determination section, a reading section and a recording section, each having any of various other configurations.

The invention can be applied to a recording apparatus that records data to an optical disc, such as a disc camcorder, an optical disc drive and a DVD recorder.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus that records data to an optical disc that includes a data recording area where the data is recorded at a predetermined recording density and a low recording-density area that has a recording density lower than that of the data recording area, wherein recording condition information is pre-recorded in the low recording-density area and the recording condition information is copied and recorded to a predetermined write area predefined in the data recording area in a predetermined closing process, the recording apparatus comprising:
    a determination section that determines, based on a readout process performed on the optical disc when the optical disc is inserted, i) whether or not the recording condition information has been copied and recorded in the write area in the data recording area, and (ii) only when the determination section determines that the recording condition information has not been copied or recorded in the write area in the data recording area, whether or not the recording condition information has been copied and recorded in a copy area in the data recording area;
    a reading section that reads the recording condition information from the low recording-density area when the determination section determines the recording condition information has not been copied or recorded in the data recording area; and
    a recording section that copies and records the recording condition information read from the low recording-density area to the copy area in the data recording area while the optical disc is inserted, when the determination section determines the recording condition information has not been copied or recorded in the data recording area.

2. The recording apparatus according to claim 1, wherein the optical disc is a DVD+R (Digital Versatile Disc +Recordable).

3. The recording apparatus according to claim 2, wherein the copy area is a disc count zone.

4. The recording apparatus according to claim 1, wherein when the optical disc is inserted, the reading section performs readout processes on the data recording area, the write area and the copy area, and reads the recording condition information from the low recording-density area when the reading section could not read the recording condition information from the write area or the copy area.

5. A recording method for recording data to an optical disc that includes a data recording area where the data is recorded at a predetermined recording density and a low recording-density area that has a recording density lower than that of the data recording area, wherein recording condition information is pre-recorded in the low recording-density area and the recording condition information is copied and recorded to a predetermined write area predefined in the data recording area in a predetermined closing process, the recording method comprising the steps of:
    when the optical disc is inserted, determining, based on a readout process performed on the disc, (i) whether or not the recording condition information has been copied and recorded in the write area in the data recording area and (ii) only when the determining determines that the recording condition information has not been copied or recorded in the write area in the data recording area, whether or not the recording condition information has been copied and recorded in a copy area in the data recording area;
    reading the recording condition information from the low recording-density area when the determining determines the recording condition information has not been copied or recorded in the data recording area; and
    copying and recording the recording condition information read from the low recording-density area to the copy area in the data recording area while the optical disc is inserted, when the determining determines the recording condition information has not been copied or recorded in the data recording area.

6. A recording medium including a computer-readable recording program executable by a computer,
    when an optical disc, in which recording condition information is pre-recorded in a low recording-density area that has a recording density lower than that of a data recording area where data is recorded at a predetermined recording density and the recording condition information is copied and recorded to a predetermined write area in the data recording area in a predetermined closing process, is inserted, the recording program causing the computer to execute the steps of:
    determining, based on a readout process performed on the optical disc, (i) whether or not the recording condition information has been copied and recorded in the write area of the data recording area and (ii) only when the determining determines that the recording condition information has not been copied or recorded in the write area in the data recording area, whether or not the recording condition information has been copied and recorded in a copy area in the data recording area;
    reading the recording condition information from the low recording-density area when the determining determines the recording condition information has not been copied or recorded in the data recording area; and
    copying and recording the recording condition information read from the low recording-density area to the copy area in the data recording area while the optical disc is inserted, when the determining determines the recording condition information has not been copied or recorded in the data recording area.

* * * * *